United States Patent [19]

Unverrich

[11] Patent Number: 5,383,178
[45] Date of Patent: Jan. 17, 1995

[54] NETWORK COMMENTATOR

[75] Inventor: Rod Unverrich, Colorado Springs, Colo.

[73] Assignee: Hewlett-Packard Company, Palo Alto, Calif.

[21] Appl. No.: 857,894

[22] Filed: Mar. 26, 1992

[51] Int. Cl.⁶ .............................................. H04Q 9/00
[52] U.S. Cl. ......................................... 370/17; 370/13; 370/85.5; 370/85.15; 371/62
[58] Field of Search ....................... 370/13, 14, 15, 16, 370/16.1, 17, 85.4, 85.3, 85.15, 85.1; 371/15.1, 20.1, 20.4, 23, 24, 29.1, 48, 55, 61, 62, 20.6; 340/825.05, 825.06, 825.5, 825.51

[56] References Cited

U.S. PATENT DOCUMENTS

| | | | |
|---|---|---|---|
| 4,321,666 | 3/1982 | Tasar et al. | 371/62 |
| 4,323,966 | 4/1982 | Whiteside et al. | 371/62 |
| 4,550,407 | 10/1985 | Couasnon et al. | 371/29.1 |
| 4,949,252 | 4/1990 | Hauge | 371/29.1 |
| 5,182,747 | 1/1993 | Frenzel et al. | 370/85.5 |
| 5,247,517 | 9/1993 | Ross et al. | 370/85.5 |

*Primary Examiner*—Douglas W. Olms
*Assistant Examiner*—Huy D. Vu

[57] ABSTRACT

Disclosed is a system that monitors a local area network by receiving all messages transmitted over the local area network, and analyzing selected sequences of messages to determine if certain, architecturally defined, processes are properly completed. If a network station starts one of these processes, and the process does not complete normally, the system analyzes the messages involved in the process to determine the network stations that participated in the process, and the phase or phases of the process that were completed. This allows the system to provide information to a user of the system that identifies a possible cause for the process not completing, and a possible network station or stations likely to be at fault.

15 Claims, 11 Drawing Sheets

NETWORK COMMENTATOR

CROSS REFERENCE TO RELATED APPLICATIONS

This application is related to application Ser. No. 08/860,642, of Rod Unverrich, entitled "Token-Ring Beacon Finite State Machine", filed concurrently herewith, and owned by the same entity.

1. FIELD OF THE INVENTION

This invention relates to computer systems and more particularly to local area networks that connect computer systems. Even more particularly, the invention relates to an electronic instrument that tests such local area networks.

2. BACKGROUND OF THE INVENTION

Troubleshooting of Local Area Networks (LANs) requires that the technician have considerable knowledge of how the network functions, including the protocols of the network. In addition, they must have detailed knowledge of each type of message sent over the network, and the implications of each particular type of message being sent. This problem is more severe if a technician must trouble shoot more than one type of LAN, thus they must become familiar with each different protocol.

Typical prior art troubleshooting tools intercept each message, called a frame, sent over a LAN, and decode this frame to provide a more readable, English-like, version of the frame. However, a typical LAN can send 4 to 16 million bits of information per second, so troubleshooting an error condition may require the user of the troubleshooting tool to scan through many screens of decoded frame information to determine a possible cause for the fault that occurred on the LAN. For example, to detect and isolate a broken wire on a Token-Ring network may require paging through hundreds of Token-Ring Medium Access Control (MAC) frames.

Although problems on a LAN can occur at any time, problems are often associated with well defined sequences of frames on the LAN. For example, a new station attempting to connect to the LAN must go through a sequence of 5 phases, each requiring sending and receiving many MAC frames. These phases are defined by the architecture of the Token-Ring LAN. An error can occur in any of the required MAC frames for any of the phases, preventing the station from inserting itself into the LAN. The only indication to a user of the network station will be a message indicating that the station was unable to complete the station insertion process.

Should an error occur during operation of the LAN, such as the broken wire described above, the stations start a "beaconing" process to attempt recovery of the LAN. This is a complex process involving many beacon MAC frames sent over a variable period of time, and includes the possibility of two different network stations disconnecting and then reconnecting to the LAN.

The "token claiming" process is an architecturally well defined method on the LAN for determining an "active monitor", which is the network station that keeps the network operating smoothly. Should an error occur during token claiming, many frames need to be analyzed to determine the cause of the error. Neighbor notification and Ring Purge are examples of other well defined processes within a Token-Ring LAN, each of which requires many MAC frames to be sent and received over the LAN.

It is thus apparent that there is a need in the art for an improved method or apparatus which analyzes the messages sent over a LAN to provide information about the cause of an error on the LAN. There is a further need in the art for such a method or apparatus that analyzes selected error conditions that occur on a Token-Ring LAN and provide information about the cause of the selected error conditions. The present invention meets these and other needs.

SUMMARY OF THE INVENTION

It is an object of the present invention to identify selected error conditions on a Local Area Network and provide troubleshooting information about the error condition.

It is another object of the invention to identify and provide troubleshooting information for selected error conditions on a Token-Ring Local Area Network.

Another object of the invention is to identify station insertion errors on a Token-Ring Local Area Network and provide information about the causes of errors that occur during the station insertion process.

Still another object is to identify Token-Ring Local Area Network errors that cause the ring to enter a beaconing state and provide possible causes for the error.

The above and other objects of the invention are accomplished in a system that monitors a local area network by receiving all messages transmitted over the local area network, and analyzing selected sequences of messages to determine if certain, architecturally defined, processes are properly completed. If a network station starts one of these processes, and the process does not complete normally, the system analyzes the messages involved in the process to determine the network stations that participated in the process, and the phase or phases of the process that were completed. This allows the system to provide information to a user of the system that identifies a possible cause for the process not completing, and a possible network station or stations likely to be at fault.

The system uses state machines implemented in software to follow the phases of each process. The system also uses timers that time the various phases, and indicate an error if a phase does not complete normally. As each phase of a process is completed, a message is displayed to the user indicating that the phase has completed successfully, thus the user need only understand the phases of a process, not the details of the messages involved in the phases. Also, as each phase is completed, the timer for the phase is canceled, thus preventing erroneous error messages.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
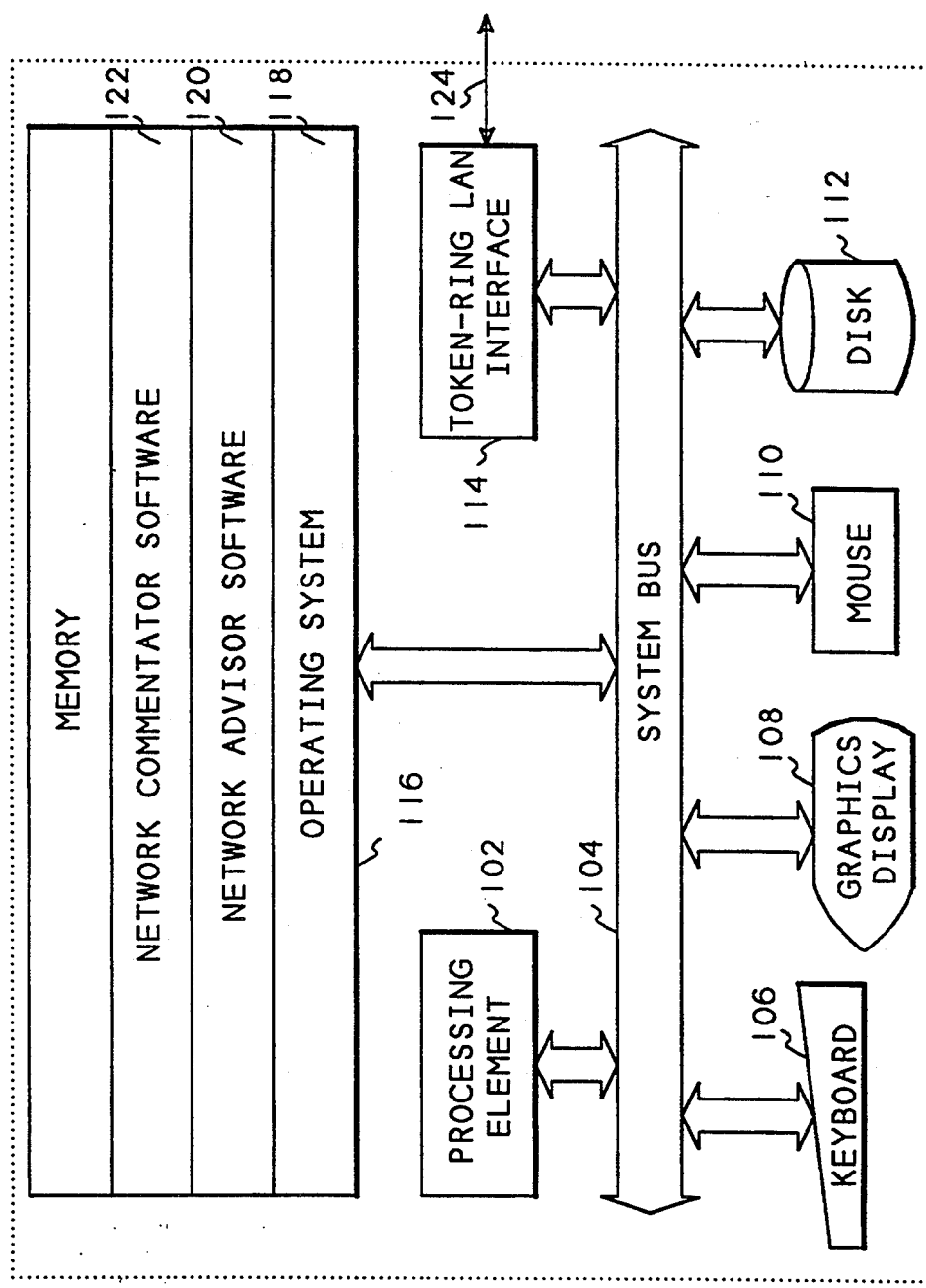
FIG. 1 shows a block diagram of the invention.

FIG. 1 shows a block diagram of the hardware and software of the invention. Referring now to FIG. 1, a computer system 100 contains a processing element 102 which communicates to other elements of the computer system 100 over a system bus 104. A keyboard 106 allows user of the system 100, typically a technician trouble shooting a local area network, to input commands and data into the computer system 100. Optionally, a mouse 110, allows the user to input graphical information into the computer system 100. A display 108 allows the computer system 100 to output information to the user of the system. A disk 112 stores the software of the present invention as well as all the data collected by the present invention.

A memory 116 contains an operating system 118 which is used by the present invention to access the keyboard, graphics display 108, mouse 110, disk 112, as well as other elements of the computer system 100. The operating system also provides the timers used in the system. The network commentator software 122, of the present invention, is part of the network advisor software 120 which performs other trouble shooting functions for the user of the system. The system 100 accesses the token-ring local area network (LAN) 124 through a token-ring LAN interface 114. The token-ring LAN interface 114 provides the hardware necessary for the network commentator software to access a token-ring local area network. A different local area network interface, not shown, could be used by the network commentator software to access other types of local area networks, such as an ethernet local area network. Although the network commentator software 122 will be described below with respect to accessing a token-ring local area network, the invention is not so limited. The invention could be used with other types of local area networks, such as ethernet, and higher level protocols such as TCP/IP, Novell, etc.

Token-ring networks use tokens and frames to transmit data on the local area network. A Token-ring local area network is made up of a group of stations connected together, wherein messages, or frames, pass from one station to another. These stations are connected as a ring, with the last station connected to the first station in the ring, such that a message will return to the station that sent it. Rings may be connected together, through devices called bridges or routers, to other rings to form a network. In the description below, the terms network and ring are used interchangeably.

A token is a control signal that is passed around the ring, from network station to network station, between transfers of data. A frame is the basic unit of data transmission, and includes delimiters, control characters, checking characters, and data. When a station wishes to transmit data, it waits until it receives a token, and it changes the token into the start of a frame. It then appends its address, called the source address, and the address of the destination network station and passes the frame along to the next station. The frame is then passed in series from station to station along the network. As the frame passes the destination station, the destination station copies the frame as it passes the frame down to the next station in the network. After the frame circles the network, the frame returns to the originating station, which removes the frame from the network and releases a new token for the next station waiting to transmit data.

One station on the network is designated as the active monitor, although any station on the network may be assigned active monitor duty from time to time. All other stations on the network serve as standby monitors, ready to assume active monitor duty if the active monitor is impaired or leaves the network. A token claiming process is used to elect a new active monitor. The active monitor performs token monitoring and other basic maintenance functions including timing control via a master clock, initiating and monitoring the ring polling process, or neighbor notification. The active monitor also insures that tokens and frames move along in a timely and orderly manner within the local area network. If the preset time for a token to completely circle the ring is exceeded, the active monitor purges the ring and issues a new token.

Soft errors are intermittent faults that temporarily disrupt normal operation of the ring. Soft errors usually include an architectural inconsistency in a received or repeated frame, or a station's inability to process a received frame. Normally, soft errors are not cause for alarm and are resolved by the token-ring's inherent error recovery procedures. Hard errors are more serious faults that cause the ring to stop operation. A station downstream from the hard error is always first to become aware of the hard error. This station initiates a process called beaconing in an attempt to reconfigure the ring and bypass the fault. If beaconing cannot restore the ring's operation, operation of the ring may have to be restored manually.

Figure 2:
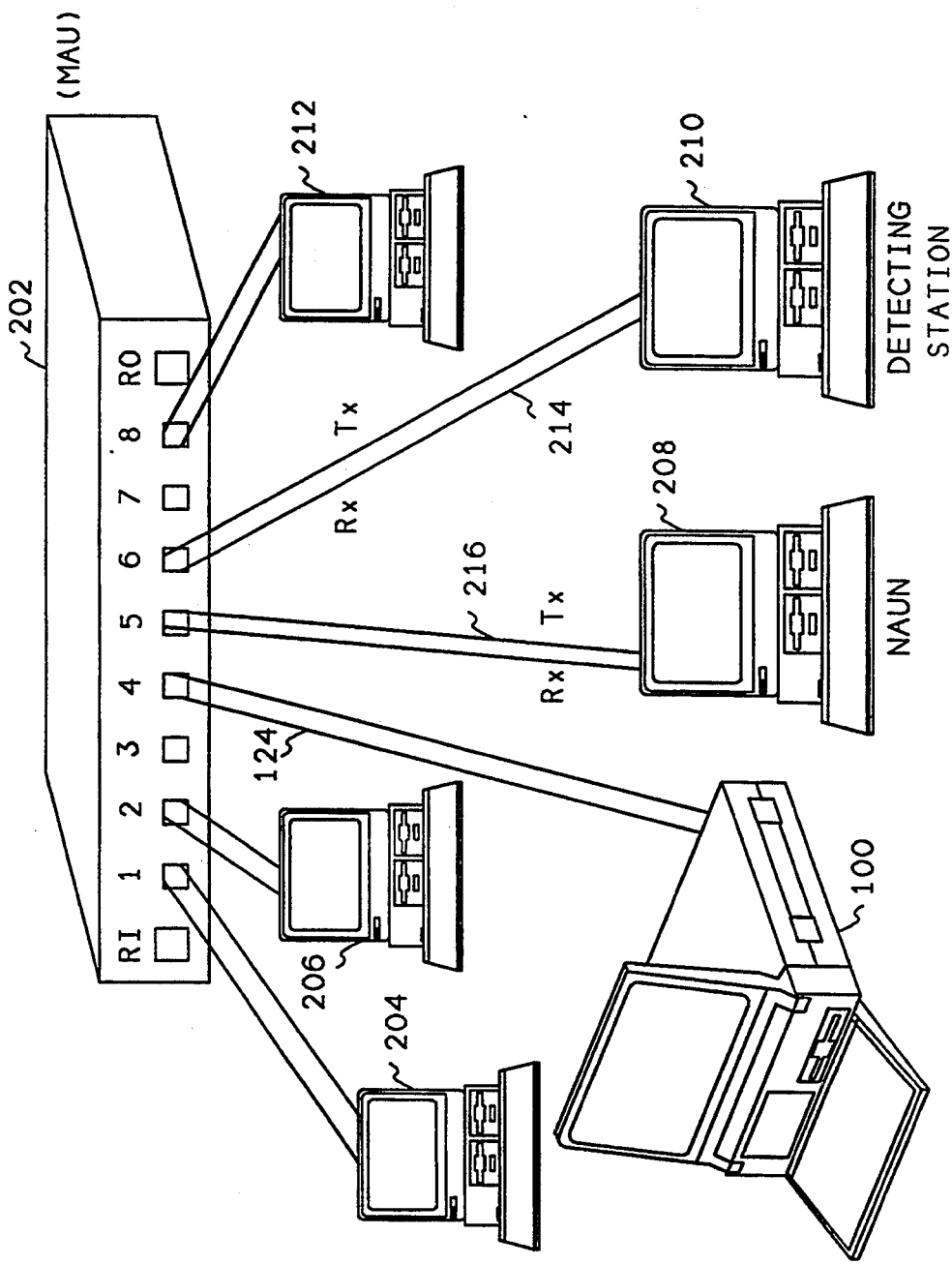
FIG. 2 shows a block diagram of a local area network being tested by the invention.

FIG. 2 shows a block diagram of a local area network being tested by the system 100 of the present invention. Referring now to FIG. 2, in a token-ring local area network, all of the network stations connect to each other through a multistation access unit (MAU) 202. A MAU, such as the MAU 202, typically has eight connection ports as well as a ring input port, and a ring output port. Multiple MAUs may be connected together by serially connecting the ring output of one MAU to the ring input of another MAU. The ring output of the last MAU within the local area network ring is connected to the ring input of the first MAU within the ring.

As shown in FIG. 2, three network stations, 204, 206, and 212 are connected to ports 1, 2, and 8 of the MAU 202, respectively. The network commentator 100 of the present invention, is shown connected to port 4 of the MAU 202, through interface cable 124. Two other stations are also shown connected to the MAU 202, station 208, identified as the "NAUN" and station 206, identified as the "detecting station". These stations are identical to the network stations 204, 206, and 212, however, they are identified separately for the description that follows.

Figure 3:
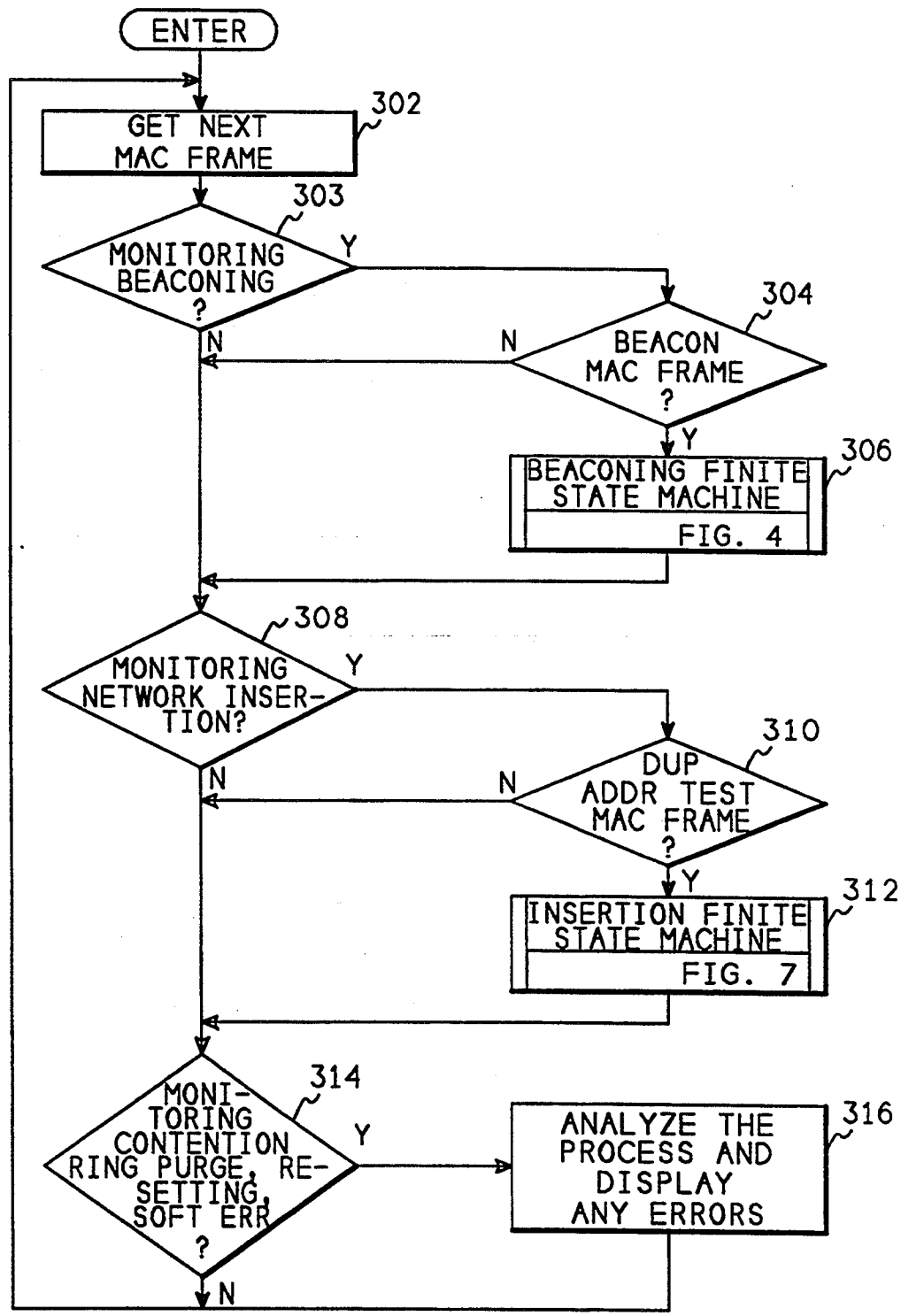
FIG. 3 shows a high level flowchart of the invention.

FIG. 3 shows a high level flowchart of the network commentator software 122 of the present invention.

This software is called by the network advisor software 120, when the user requests monitoring of certain network processes, identified below. When a user activates the network commentator software, the user may select which among the several processes the user wishes the network commentator to monitor. For example, the user may request that the network commentator software monitor the beaconing process, network station insertion process, ring purge, or any other of the identifiable processes performed by the token-ring local area network. The user identifies these processes through a menu screen, not shown.

Referring now to FIG. 3, after the user has identified the processes the user wishes to monitor, the flowchart of FIG. 3 is entered at block 302. Block 302 waits for the next medium access control (MAC) frame to be sent within the token-ring network. As this frame passes the network commentator 100 (FIG. 2) while it moves through the network, the network commentator system 100 copies the contents of this frame for analysis. After obtaining the frame, block 303 determines whether the user has requested that the network commentator 100 monitor beaconing within the token-ring network. If the user has requested beaconing monitoring, block 303 transfers to block 304 which determines whether the frame copied in block 302 is a beacon MAC frame. If not, block 304 transfers to block 308 which determines whether the user has requested monitoring network station insertion. If the user has requested monitoring network insertion, block 308 transfers to block 310 which determines whether the frame copied in block 302 is a duplicate address test MAC frame. If not, block 310 transfers to block 314 which determines whether the user has requested monitor contention, ring purge, soft errors, or other errors within the network. If any of these have been requested, block 314 transfers to block 316 which analyzes these processes using state machines similar to those described with respect to the beacon finite state machine, and the network station insertion finite state machine, which will be described below. These state machines are similar to, and modeled after, the beacon and network station insertion finite state machines. During this analysis, the system displays any errors found in these type of processes similar to the way errors are displayed during beaconing and station insertion. After displaying any errors, or if none of these processes were requested, control returns to block 302 to get the next MAC frame. This loop continues as long as the user has requested some monitoring of the network.

Figure 4:
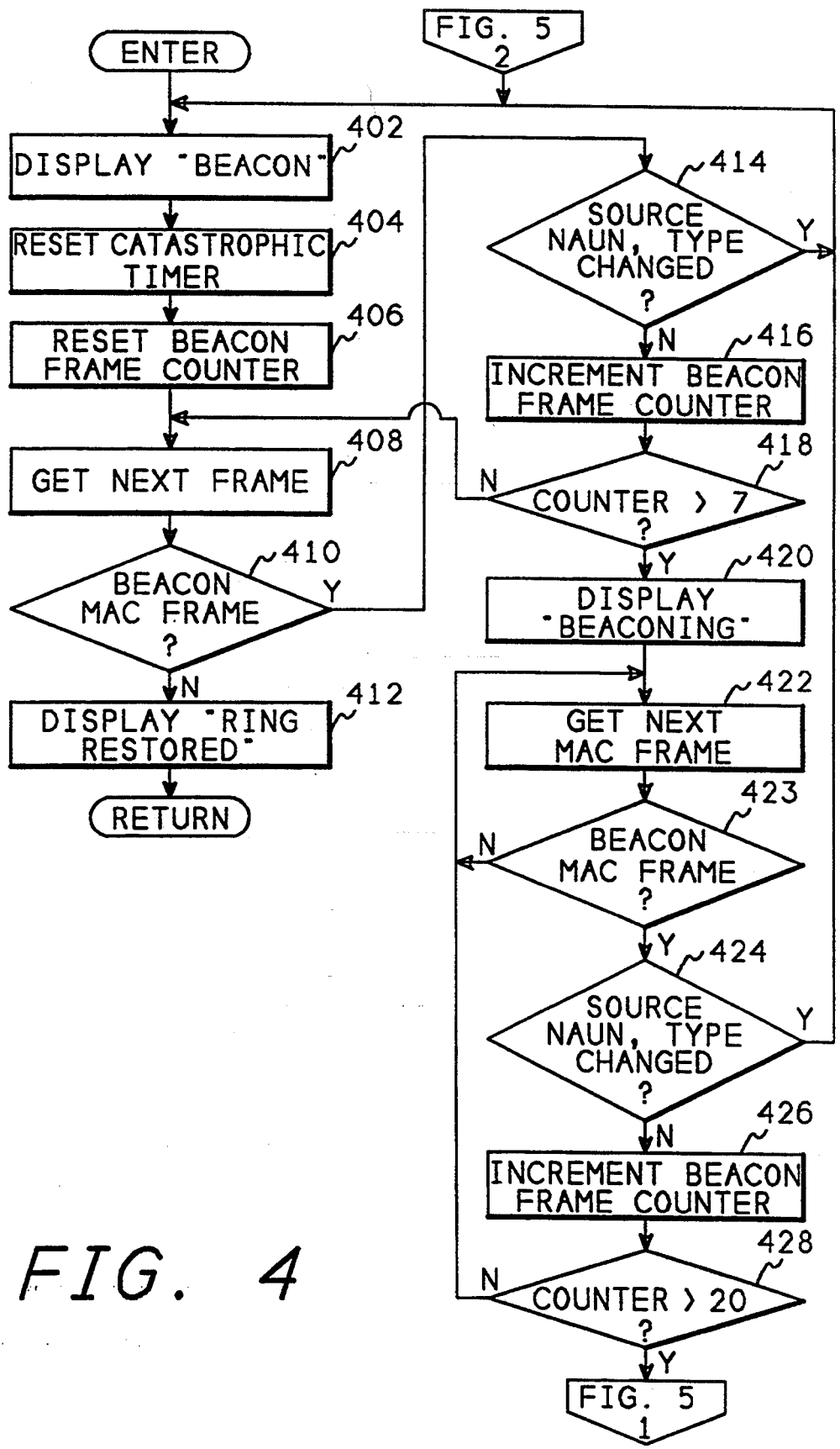
FIGS. 4 and 5 show a flowchart of the beacon finite state machine of the invention.

If the user has requested that beaconing be monitored, and the MAC frame copied by block 302 is a beacon MAC frame, control goes to block 306 which calls FIG. 4, the beaconing finite state machine to perform the monitoring.

Beaconing is the process that a token-ring network initiates in an effort to self recover from a disruption of the electrical signal path at some location in the network. Since messages pass serially through each station of the network, the disruption is first detected by the closest station "downstream" from the station having the fault. The detecting station senses a lost of signal transitions at its receiver. For example, suppose station 210 of FIG. 2 detects a loss of signal on its RX receive cable 214. This detecting station then begins periodic transmission of a special MAC frame with an all stations address. This frame, known as a beacon MAC frame, is specifically identified within the architecture of the token-ring network. The beacon MAC frame identifies the detecting station's address, station 210 of FIG. 2 for this example, as well as the address of that station's Nearest Active Upstream Neighbor (NAUN), which is station 208 of FIG. 2. In this example, an error could exist within the RX cable 214 of the detecting station 210, or within the TX cable 216 of the NAUN station 208, or the error could exist within the MAU 202 between ports 5 and 6.

The network station that is downstream from the detecting system, for example, station 212 of FIG. 2 receives and forwards the beacon MAC frame and each subsequent station repeats the MAC frame so that every station in the ring becomes aware of the beaconing process. Once the beaconing process starts, no additional stations can attach to the ring. All other stations on the ring can still receive and transmit normally, except for either the detecting station, for example, station 210, or the NAUN, for example, station 208. Thus, each capable station continues to receive and retransmit the beacon MAC frames to the next station on the ring.

When the detecting station's NAUN, for example, station 208 in FIG. 2, recognizes eight beacon MAC frames containing its address, it removes itself electrically from the ring, and performs a self test on its TX and RX connection cables. If this self test fails, the NAUN stays off the ring, and theoretically the problem has been removed allowing the ring to continue and allowing the remaining stations on the ring to continue normal usage of the ring. If the NAUN station passes the self test, it reattaches itself to the ring, assuming that it is not at fault.

After a certain number of beacon frames have been sent, typically 20 frames, the detecting station will assume that the NAUN station has successfully completed its self test. At this time, the detecting station assumes that it may be causing the fault, so the detecting station removes itself electrically from the ring and also performs a self test on its own TX and RX cables. Like the NAUN, if the detecting station fails the test, it removes itself from the ring, again theoretically removing the cause of the problem. If, however, the detecting station passes the self test, it will reattach to the ring. One of two conditions then exists. Either the problem station has been removed and the ring has recovered, or the fault still exists on the ring causing the ring to enter a stuck beacon state. When a stuck beacon state is entered, the nature of the fault is such that the ring cannot self recover, and manual intervention is required.

In the above example, when the detecting station 210 started transmitting beacon MAC frames, these frames were copied by the network commentator 100 of the present invention, as the frames passed by this device. Thus, block 302 would have copied a beaconing MAC frame, block 303 would have transferred to block 304 (assuming the user had requested that beaconing be monitored), and block 304 would have determined that the MAC frame was a beaconing MAC frame, thus FIG. 4 would be called.

Figure 5:
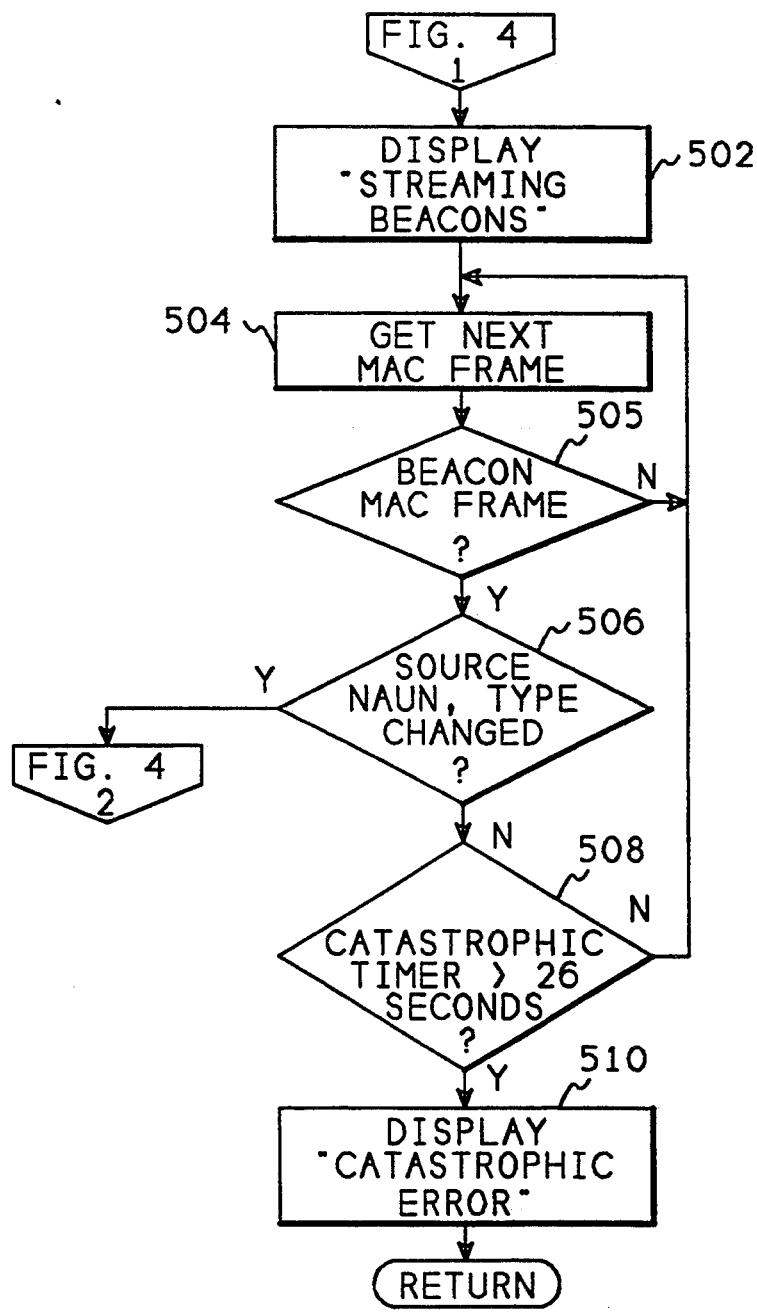

FIGS. 4 and 5 show a flowchart of the beacon finite state machine of the present invention. Referring now to FIGS. 4 and 5, after entry, block 402 displays a beacon message on the display 108 of the present invention. This alerts the user that a beacon frame has been received and that some error condition exists within the token-ring. After displaying the beacon message, block 404 resets the catastrophic timer, which will time for 26 seconds. Block 406 then resets the beacon frame counter which will be used to determine when the NAUN should have disconnected from the network. Block 408 gets the next MAC frame that is received from the token-ring local area network, and block 410 determines whether the frame is a beacon MAC frame. If the frame is not a beacon MAC frame, then the ring has restored itself so block 410 transfers to block 412 which displays a network ring restored message and then returns to FIG. 3.

If the frame received is a beacon MAC frame, block 410 transfers to block 414 which determines whether the source address, i.e. the detecting station address, the NAUN address, or the type has changed. There are four types of beaconing—recovery mode set, signal loss error, streaming signal not claim token MAC frame, and streaming signal claim token MAC frame. If any of these have changed, then a new detecting station may have started beaconing, therefore, block 414 transfers back to block 402 to redisplay the beacon message and display the new station addresses. If none of these have changed, block 414 transfers to block 416 which increments the beacon frame counter. Block 418 then determines whether the counter is greater than seven, which is the state at which the NAUN should have disconnected itself from the network. If the counter is not greater than seven, block 418 transfers back to block 408 to get the next frame from the network. This loop continues until either a non-beacon MAC frame is received or until eight beacon MAC frames have been received.

After eight beacon MAC frames have been received, block 418 transfers to block 420 which displays the beaconing message to the user of the system. This indicates that the beacon state has continued for at least eight frames, therefore, the NAUN station should be disconnecting from the network to perform a self test. Block 422 then gets the next MAC frame and block 423 determines if it is a beacon MAC frame. If it is a beacon MAC frame, block 424 determines whether the source address, NAUN address, or type have changed. If any of these have changed, block 424 transfers back to block 402 to redisplay the beacon message since a new station has started beaconing. If these have not changed, block 424 transfers to block 426 which increments the beacon frame counter and then block 428 determines whether the counter has reached a value of 20. If 20 beacon MAC frames had not yet been received, block 428 transfers back to 422 to get the next MAC frame.

After receiving 20 beacon MAC frames, block 428 transfers to block 502 on FIG. 5. Block 502 displays the streaming beacons message. This tells the user that the NAUN has disconnected and reconnected itself to the local area network. Block 504 then gets the next MAC frame and block 505 determines if it is a beacon MAC frame. If it is a beacon MAC frame, block 506 determines whether the source address, NAUN address, or type have changed and if not, block 508 determines whether the catastrophic timer, which was reset in block 404, has expired. If none of these have occurred, block 508 transfers to block 504. The system stays in this loop until either a new type of MAC frame is received, which will cause block 506 to return to block 402, or until the catastrophic timer expires. If the catastrophic timer expires, block 508 transfers to block 510 which informs the user that a catastrophic error has occurred, and that manual intervention will be necessary to restore the network ring. After displaying the catastrophic error message, block 510 returns to FIG. 3.

Figure 6:
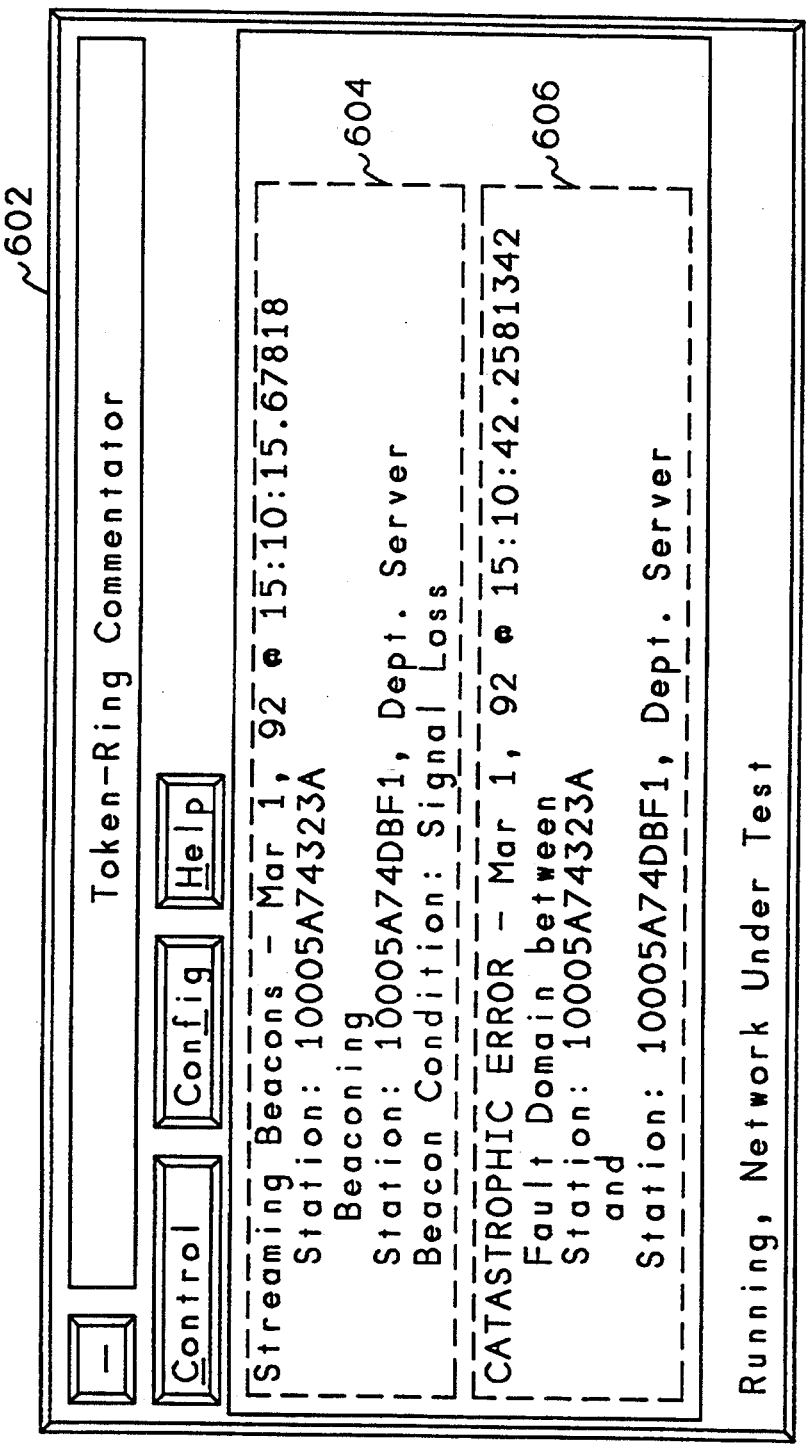
FIG. 6 shows an output display of a beaconing error.
Figure 7:
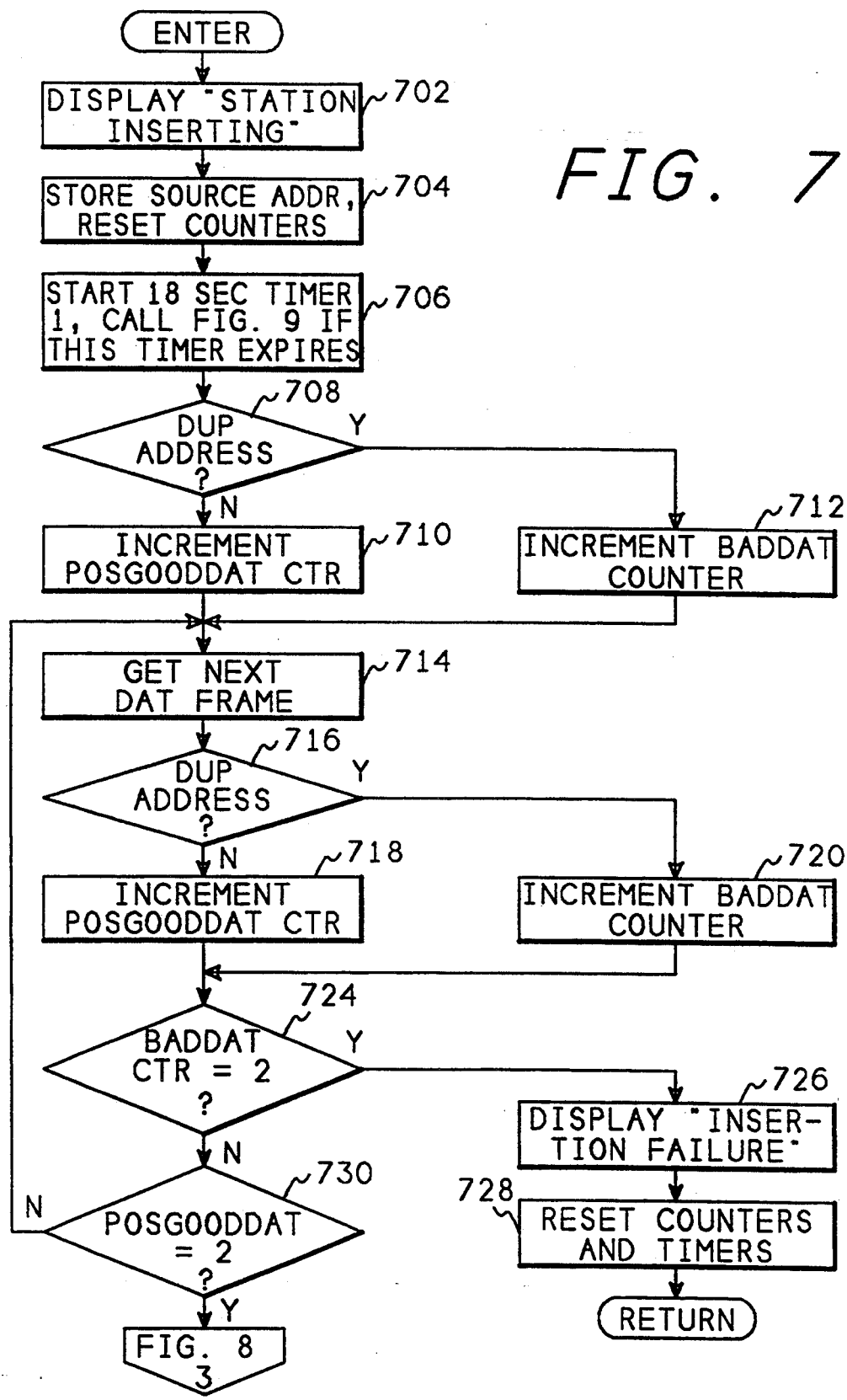
FIGS. 7, 8, 9, 10, and 11 show a flowchart of the station insertion finite state machine of the invention.
Figure 8:
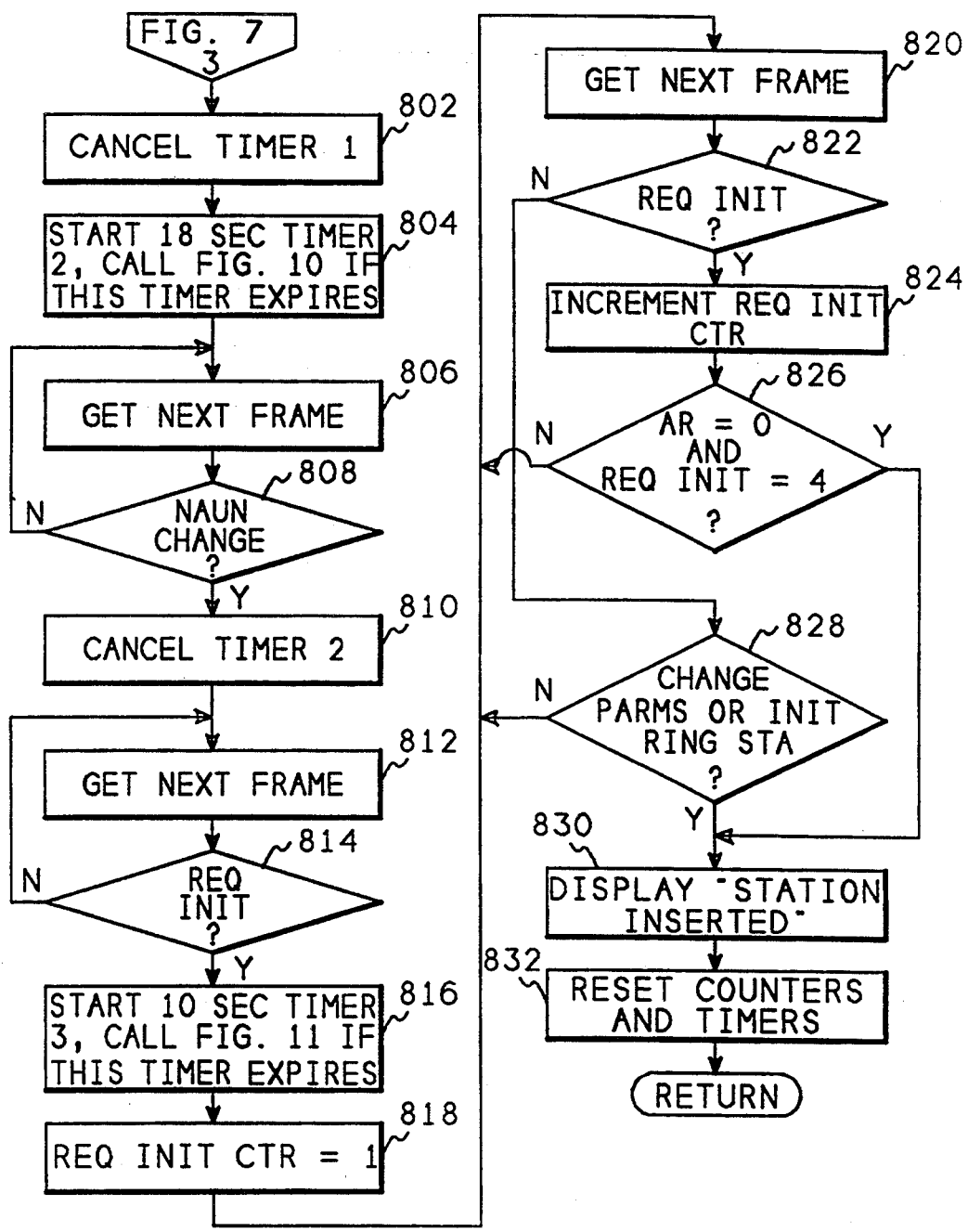

FIG. 6 shows an example display output for streaming beacons and a catastrophic error, as identified in FIGS. 4 and 5. Referring now to FIG. 6, a screen output 602 is shown having two error messages. The first error message, indicated by the dashed line 604, would be displayed by block 502. This message identifies the date and time of the message, the address of the station that is sending the beacon MAC frames, and the address of the NAUN of the beaconing station. In addition, the message "beacon condition: signal loss" is displayed to identify to the user of the system a possible cause of the error. The catastrophic error message, identified by dashed lines 606, is the message that would be output by block 510 of FIG. 5. This message identifies the date and time of the message, and identifies two stations. The system has determined that the fault lies between these two stations.

As described above with respect to FIG. 3, if a user requests that the network commentator monitor network station insertion, and the network commentator receives a duplicate address test (DAT) MAC frame, the network station insertion finite state machine will be called. FIGS. 7, 8, 9, and 10, and 11 show a flowchart of the station insertion finite state machine of the present invention. Referring to FIGS. 7, 8, 9, 10, and 11, the state machine will be entered at block 702 of FIG. 7. Block 702 displays a "station inserting" message to alert the user that one of the stations is attempting to insert into the ring.

The station insertion process involves five separately defined states. These states are defined within the architectural specification of the IBM token-ring network, IBM Corporation publication SC30-3374-02 available from International Business Machines Corporation, Armonk, N.Y. The first phase of the station insertion is called lobe test. In this phase the station has not yet connected to the network ring, so its transmit and receive cables are physically connected together at the MAU port. In this phase, the station sends a signal over its transmit cable and this signal is sent back over the station's receive cable, since they are connected together. This allows the station to test whether its transmit and receive cables are functioning properly.

If the station passes the lobe test phase, it then sends a signal to activate a relay within the MAU which causes the station's transmit and receive cables to be connected into the local area network ring. The station then waits a specified period of time, as defined by the architectural specification, to detect whether the ring already has an active monitor present. If an active monitor is already present, either an active monitor present, standby monitor present, or a ring purge MAC frame will be received before the timer expires. If one of these frames is received, the station assumes that an active monitor is present on the network and continues to the next phase, called duplicate address check. If one of these frames is not received before the timer expires, the station will assume no active monitor is present and will attempt to make itself the active monitor.

If an active monitor is present, the station proceeds to the next phase, called duplicate address check. During this phase the station will send a duplicate address test (DAT) MAC frame out on the network in an attempt to determine whether any other station on the network has the same address. If a duplicate address is found, the station will remove itself and not attempt further insertion into the ring. If the station receives the DATMAC frame, that is, the frame has circled the entire network ring without any other station identifying itself as a duplicate address, the insertion proceeds to the next phase, which is participation in neighbor notification.

In the neighbor notification phase, all the stations on the ring identify themselves so that the station downstream from each station will know the address of its nearest active upstream neighbor (NAUN). It is through neighbor notification that the station was able to identify the NAUN in the beaconing process described above. After neighbor notification is complete, the insertion process enters the last phase, which is to request parameters from a ring parameters server station, if one is present. After completing this phase the station is inserted into the ring.

Block 702 displays the station inserting message after the duplicate address test MAC frame is received, indicating that a station that is attempting insertion has entered the duplicate address check phase of the insertion process. Block 704 stores the source address of the station attempting insertion and resets all the counters used in this finite state machine. Block 706 then starts timer 1 which is an 18 second timer used to determine whether the inserting station is able to complete the duplicate address check phase. Block 708 then determines whether a duplicate address is detected on the ring and if so, block 708 transfers to block 712 which increments a BADDAT counter indicating that at least one duplicate address has been found. If no duplicate address is found, block 708 transfers to block 710 which increments the POSGOODDAT counter indicating that a possibly good duplicate address test frame has been received. Block 714 then gets the next DAT frame from the local area network and block 716 determines whether this frame indicates that a station has a duplicate address. If a duplicate address has been detected, block 716 transfers to block 720 which increments the BADDAT counter. If no duplicate address is detected, block 716 transfers to block 718 which increments the POSGOODDAT counter. After incrementing one of these counters, block 724 determines whether the BADDAT counter is equal to two. If this counter is equal to two, then a duplicate address has been detected on the ring so block 724 transfers to block 726 which displays an insertion failure message telling the user of the network commentator that the station that was attempting insertion has failed because of the duplicate address. Block 728 then resets all the counters and timers and returns to FIG. 3.

Figure 9:
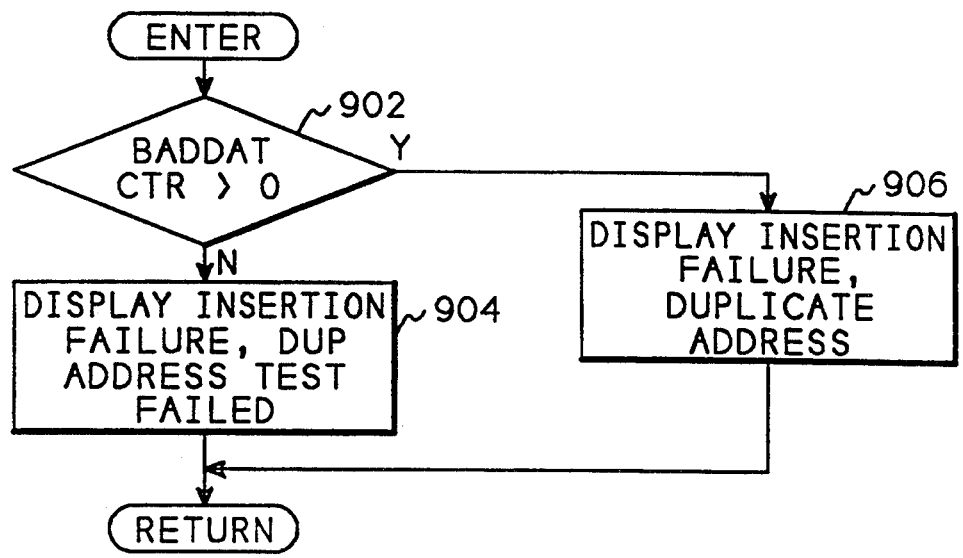

If the BADDAT counter is not equal to two, block 724 transfers to block 730 which checks the POSGOODDAT to determine whether it is equal to two. If this counter is not equal to two, block 730 returns to block 714 to get the next DAT frame. If the POSGOODDAT counter is equal to two, block 730 transfers to block 802 of FIG. 8. Block 802 cancels timer 1, the 18 second counter set up in block 706, since the inserting station has completed the duplicate address check phase and is now entering the participation in neighbor notification phase. If timer 1 expires before being canceled, FIG. 9 is called automatically by the operating system 118 (FIG. 1), since the station has failed the duplicate address test.

Block 804 then starts a second timer, timer 2, and sets it to 18 seconds. Block 806 gets the next frame and block 808 waits until the NAUN changes within the next frame. That is, if the NAUN has not changed, block 808 transfers back to block 806 to wait for the next frame in which the NAUN has changed. After detecting such a frame, block 808 transfers to block 810 which cancels timer 2 since the inserting station has now completed the participation in neighbor notification. If timer 2 expires prior to the NAUN change, the expiration of timer two will cause FIG. 10 to be automatically called, since the neighbor notification has failed.

After canceling timer two, block 812 gets the next frame and block 814 determines whether this frame is a request-init frame. If the frame is not a request-init, block 814 transfers back to block 812 to wait for a request-init frame. After receiving a request-init frame, block 814 transfers to block 816 which starts timer 3, a ten second timer. Block 818 then sets the request-init counter equal to one and block 820 gets the next frame. Block 822 determines whether the next frame is request-init and if it is, transfers to block 824 which increments the request-init counter. Block 826 then determines whether the AR bit within the frame is equal to zero and whether the request-init counter is equal to a value of four. The AR bit will be set by another station if it recognizes the address. If neither of these is true, block 826 transfers back to block 820 to wait until both these conditions are true. Once the conditions are true, block 826 transfers to block 830 which displays a station inserted message telling the user of the system that the station has successfully completed the last phase and is now inserted into the ring. Block 832 then resets counters and timers and returns to FIG. 3.

If the next frame received is not a request-init frame, block 822 transfers to block 828 which determines whether the frame is a change parameters or init ring station frame. If it is neither one, block 828 returns to block 820 to get the next frame. If the frame received was a change parameters or init ring station, block 828 transfers to block 830 since the station has completed the insertion process.

FIG. 9 is called automatically if timer 1 expires before being canceled. Referring now to FIG. 9, after entry, block 902 determines whether the BADDAT counter is greater than zero. If the counter is greater than zero, block 902 transfers to block 906 which displays a message indicating insertion failed, because of a duplicate address. If the BADDAT counter is not greater than zero, block 902 transfers to block 904 which displays a message indicating that insertion failed because the duplicate address test failed. After displaying one of these two messages, FIG. 9 returns to its caller.

Figure 10:
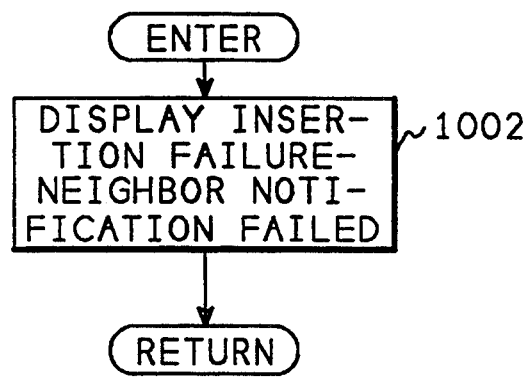

FIG. 10 is called whenever timer 2 expires before it is canceled. After entry, block 1002 displays an insertion failure message indicating that neighbor notification failed during the insertion process.

Figure 11:
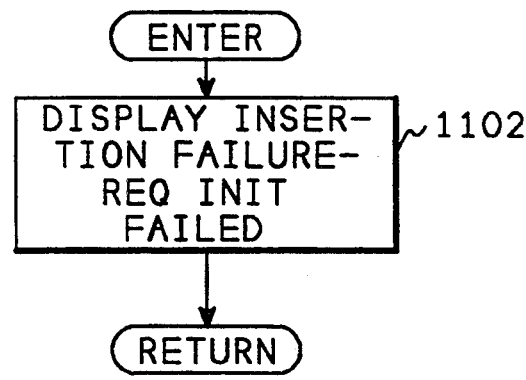

FIG. 11 is called if timer three expires before being canceled. After entry, block 1102 displays an insertion failure message indicating that the request-init failed.

Figure 12:
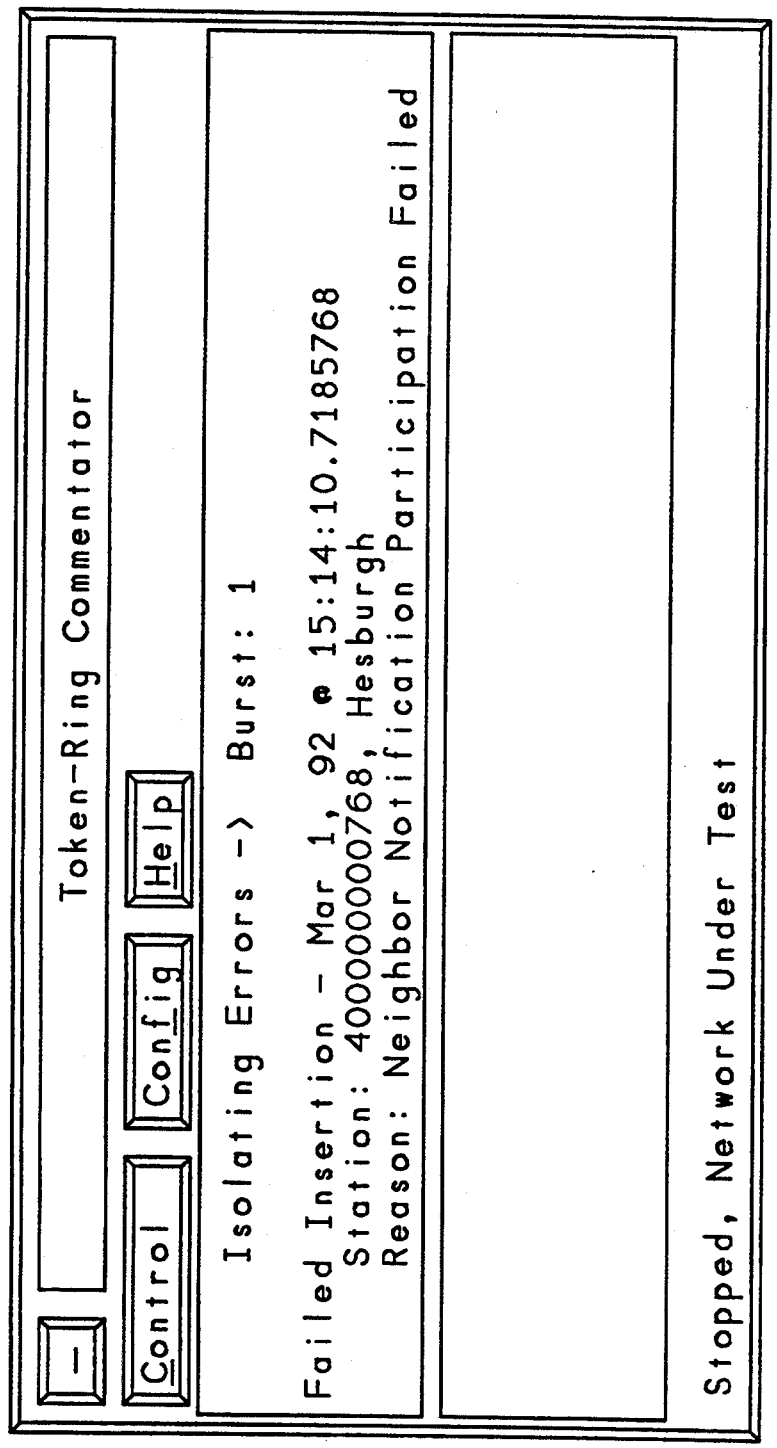
FIG. 12 shows an output display of a station insertion error.

FIG. 12 shows an example display of an error message from the station insertion finite state machine. As shown in FIG. 12, the station attempting insertion has failed because neighbor notification participation failed, that is, this message was displayed by block 1002 of FIG. 10.

Figure 13:
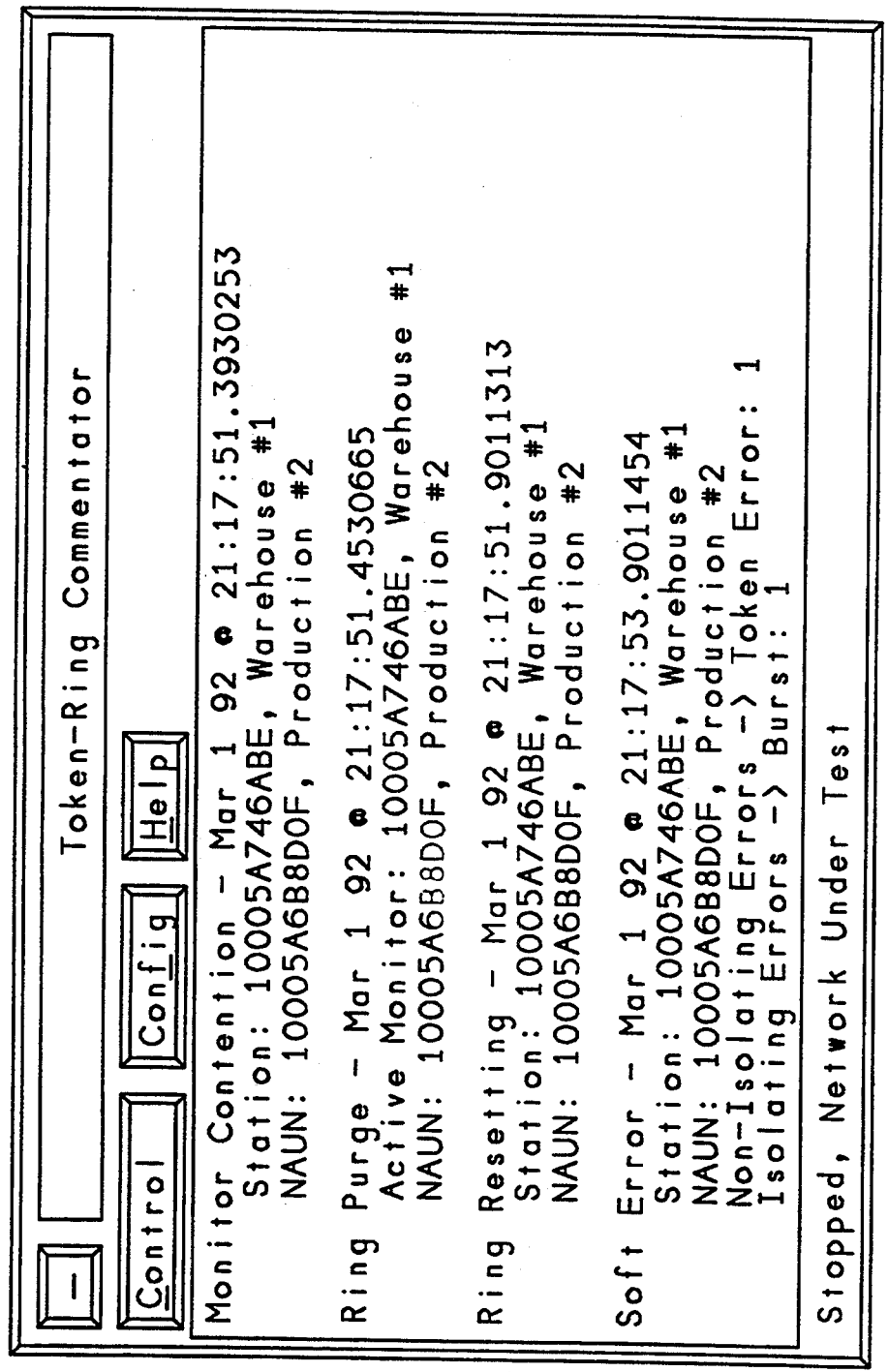
FIG. 13 shows an output display of other errors tested by the invention.

FIG. 13 shows a display from the token-ring commentator system of other errors that can be monitored and displayed within the system. For example, FIG. 13 shows that monitor contention can be displayed, ring purges within the ring, ring resetting, and soft errors.

The network commentator can also display messages during the claim token process.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A test device for identifying one of a plurality of error types in a token-ring local area network, wherein said token-ring local area network has at least one network computer station attached thereto, and further wherein said at least one network computer station may send a plurality of messages, each message being one of several types of messages, through said token-ring local area network, said test device comprising:

interface means for connecting said test device to said token-ring local area network and for receiving a plurality of messages being transmitted over said local area network by said at least one network computer station;

a first timer means connected to said interface means for timing a duration between received messages;

means connected to said interface means and said first timer means for analyzing each of said plurality of messages, and for starting said first timer means when a first duplicate address type of message is received; and means connected to said interface means and said first timer means for displaying a duplicate address test failure error message when a time value within said first timer means exceeds a first predetermined duration before said interface means receives a second duplicate address type of message.

2. A test device for monitoring a token-ring local area network, wherein said token-ring local area network has at least one network computer station attached thereto, and further wherein said at least one network computer station may send a plurality of frames, each frame being one of several types of frames, through said token-ring local area network, said test device comprising:

an interface connecting said test device and said token-ring local area network, wherein said interface receives a plurality of frames being transmitted over said local area network by said at least one network computer station;

a first timer connected to said interface, wherein said first timer measures an amount of time between frames received by said interface;

an analyzer connected to said interface and said first timer, wherein said analyzer examines each of said plurality of frames and starts said first timer when a first duplicate address type of frame is received by said interface;

a display system connected to said interface and said analyzer, wherein said display system displays a duplicate address test failure error message when said first timer exceeds a first predetermined amount of time before said interface receives a second duplicate address type of frame.

3. The test device of claim 2 further comprising:

a bad-dat-frame counter connected to said analyzer, wherein said bad-dat-frame counter counts a number of duplicate address type of frames received that indicate a duplicate address; and a second display system connected to said bad-dat-frame counter and said interface, wherein said display system displays an insertion failure error message when said bad-dat-frame counter exceeds a first predetermined value.

4. The test device of claim 3 further comprising:

a second timer connected to said interface;

a good-dat-frame counter connected to said interface means, wherein said good-dat-frame counter counts a number of duplicate address type of frames received that do not indicate a duplicate address;

a second analyzer connected to said second timer, said good-dat-frame counter and said interface means, wherein said analyzer analyzes each of said plurality of frames, and starts said second timer when said good-dat-frame counter exceeds a second predetermined value; and a third display system connected to said interface and said second timer, wherein said third display system displays a neighbor notification failed type of error message when said second timer exceeds a second predetermined time before said interface receives a frame indicating a nearest active upstream neighbor has changed.

5. The test device of claim 4 further comprising:

a third timer connected to said interface;

a request-init counter connected to said interface;

a third analyzer connected to said interface and said third timer, wherein said third analyzer analyzes each of said plurality of frames and starts said third timer when said interface receives a frame indicating a nearest active upstream neighbor has changed and said interface subsequently receives a request init frame, and further wherein said third analyzer increments said request-init counter each time a request init frame is received;

a fourth display system connected to said third timer and said third analyzer, wherein said fourth display system displays a request init failed type of error message when said third timer exceeds a third predetermined time before said request-init counter exceeds a third predetermined number.

6. The test device of claim 5 further comprising:

a fifth display system connected to said interface for displaying a station inserted message after said request-init counter exceeds said third predetermined number.

7. The test device of claim 1 further comprising:

a bad-dat-message counter means connected to said means for analyzing, said bad-dat-message counter means for counting a number of duplicate address type of messages received that indicate a duplicate address; and means connected to said bad-dat-message counter means and said interface means for displaying an insertion failure error message when said bad-dat-message counter means exceeds a first predetermined value.

8. The test device of claim 7 further comprising:

a second timer means connected to said interface means;

a good-dat-message counter means connected to said interface means, said good-dat-message counter means for counting a number of duplicate address type of messages received that do not indicate a duplicate address;

means connected to said second timer means, said good-dat-message counter means, and said interface means, for analyzing each of said plurality of messages, and for starting said second timer means when said good-dat-message counter means exceeds a second predetermined value; and means connected to said interface means and said second timer means for displaying a neighbor notification failed type of error message when said second timer means exceeds a second predetermined duration before a message is received indicating a nearest upstream active neighbor has changed.

9. The test device of claim 8 further comprising:

a third timer means connected to said interface;

a request-init counter means connected to said interface;

means connected to said interface means and said third timer means for analyzing each of said plurality of messages and for starting said third timer after said interface means receives a message indicating a nearest active upstream neighbor has changed and also after said interface means receives a request init message, and for incrementing said request-init counter means each time a request init message is received;

means connected to said third timer means and said interface means for displaying a request init failed type of error message when said third timer means exceeds a third predetermined amount of time before said request-init counter means exceeds a third predetermined number.

10. The test device of claim 9 further comprising:

means connected to said interface means for displaying a station inserted message after said request-init counter means exceeds said third predetermined number.

11. A method for monitoring a token-ring local area network, wherein said token-ring local area network has at least one network computer station attached thereto, and further wherein said at least one network computer station may send a plurality of frames, each frame being one of several types of frames, through said token-ring local area network, said method comprising the steps of:

(a) receiving a plurality of frames being transmitted over said local area network by said at least one network computer station;

(b) examining each of said plurality of frames and starting a first timer after receiving a first duplicate address type of frame;

(c) displaying a duplicate address test failure error message when said first timer exceeds a first predetermined time before receiving a second duplicate address type of frame.

12. The method of claim 11 further comprising the steps of:

(d) counting a number of duplicate address type of frames received that indicate a duplicate address; and (e) displaying an insertion failure error message when said number of duplicate address type of frames exceeds a first predetermined count.

13. The method of claim 12 further comprising the steps of:

(f) counting a number of duplicate address type of frames received that do not indicate a duplicate address;

(g) examining each of said plurality of frames, and starting a second timer when said count of said duplicate address type of frames that do not indicate a duplicate address exceeds a second predetermined value; and (h) displaying a neighbor notification failed type of error message when said second timer exceeds a second predetermined time before a frame is received that indicates a nearest active upstream neighbor has changed.

14. The method of claim 13 further comprising the steps of:

(i) examining each of said plurality of frames and starting a third timer after receiving a frame indicating a nearest active upstream neighbor has changed and after also receiving a request init frame;

(j) displaying a request init failed type of error message when said third timer exceeds a third predetermined time before a predetermined number of request init frames have been received.

15. The method of claim 14 further comprising the steps of:

(k) displaying a station inserted message after receiving said predetermined number of request init frames.

* * * * *